United States Patent
Nguyen et al.

(10) Patent No.: US 11,391,139 B2
(45) Date of Patent: Jul. 19, 2022

(54) STAGED PROPPING OF FRACTURE NETWORKS

(71) Applicant: Halliburton Energy Services, Inc., Houston, TX (US)

(72) Inventors: Philip D. Nguyen, Houston, TX (US); Janette Cortez Montalvo, Porter, TX (US); Loan Vo, Houston, TX (US); Ubong Akpan Inyang, Humble, TX (US); James William Ogle, Livingston, TX (US); Aaron Gene Russell, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 440 days.

(21) Appl. No.: 16/484,084

(22) PCT Filed: Apr. 12, 2017

(86) PCT No.: PCT/US2017/027272
§ 371 (c)(1),
(2) Date: Aug. 6, 2019

(87) PCT Pub. No.: WO2018/190835
PCT Pub. Date: Oct. 18, 2018

(65) Prior Publication Data
US 2019/0383126 A1    Dec. 19, 2019

(51) Int. Cl.
| E21B 43/267 | (2006.01) |
| C09K 8/80 | (2006.01) |
| E21B 43/26 | (2006.01) |
| C09K 8/66 | (2006.01) |

(52) U.S. Cl.
CPC .............. *E21B 43/267* (2013.01); *C09K 8/66* (2013.01); *C09K 8/80* (2013.01); *E21B 43/26* (2013.01)

(58) Field of Classification Search
CPC ......... E21B 43/267; E21B 43/26; C09K 8/66; C09K 8/80
See application file for complete search history.

(56) References Cited

U.S. PATENT DOCUMENTS

| 6,935,426 B1 * | 8/2005 | Rainbolt | E21B 37/06 166/279 |
| 7,784,541 B2 * | 8/2010 | Hartman | C09K 8/76 166/280.1 |
| 8,119,574 B2 * | 2/2012 | Panga | E21B 43/04 507/200 |
| 8,607,870 B2 | 12/2013 | Gu et al. | |
| 8,613,314 B2 | 12/2013 | Garcia-Lopez De Victoria et al. | |
| 2005/0130848 A1 | 6/2005 | Todd et al. | |
| 2013/0105157 A1 | 5/2013 | Barmatov et al. | |
| 2013/0284437 A1 | 10/2013 | Nguyen et al. | |
| 2014/0054033 A1 * | 2/2014 | Nguyen | E21B 43/267 166/280.1 |
| 2014/0251626 A1 | 9/2014 | Gomaa et al. | |
| 2014/6262281 | 9/2014 | Chen et al. | |
| 2014/0289328 A1 | 10/2014 | Crews | |
| 2014/6299318 | 10/2014 | Crews et al. | |
| 2015/0083420 A1 | 3/2015 | Gupta et al. | |
| 2015/0129211 A1 | 5/2015 | Dusseault et al. | |

FOREIGN PATENT DOCUMENTS

| CA | 2997101 A1 | 5/2017 |
| WO | 2018036343 A1 | 3/2016 |

OTHER PUBLICATIONS

International Search Report and Written Opinion dated Mar. 29, 2018: International PCT Application No. PCT/US2017/027272.
Stanchits, S. et al. "Monitoring the Early Onset of Hydraulic Fracture Initiation by Acoustic Emission and Volumetric Deformation Measurements", ARMA 13-664, 2013.
Zoback, et al. "Laboratory Hydraulic Fracturing Experiments in Intact and Pre-Fractured Rock", Int. J. Rock Mech. Min. Sci. Geomech. 1977, 14, pp. 49-58.
Ishida, et al. "Influence of Fluid Viscosity on the Hydraulic Fracturing Mechanism", Transactions of the ASME, vol. 126., Sep. 2004, pp. 190-200.
Ingram, et al. "Methods Improve Stimulation Efficiency of Perforation Clusters in Completions", J Pet. Tech., vol. 66 (4), Apr. 2014, 32-36.
Soliman, et al. "Fracturing Design Aimed at Enhancing Fracture Complexity", SPE 130043, SPE EUROPEC/EAGE Annual Conference and Exhibition held in Barcelona, Spain, Jun. 14-17, 2010.

\* cited by examiner

*Primary Examiner* — Catherine Loikith
(74) *Attorney, Agent, or Firm* — McGuireWoods LLP

(57) ABSTRACT

Creating a fracture network extending from a wellbore into a subterranean formation. The method includes introducing a series of fluids into the fracture network in a subterranean formation, thereby forming a proppant pack in the fracture network. The series of fluids comprise: a microproppant slurry comprising a microproppant having an average diameter less than about 25 microns; a proppant slurry comprising a proppant having an average diameter of about 75 microns to about 500 microns; and a sweep fluid having a microproppant weight percentage by weight of the sweep fluid that is from 0 to about the same of the microproppant weight percentage in the microproppant slurry by weight of the microproppant slurry. The introduction of the microproppant slurry is not immediately followed by introduction of the proppant slurry. The introduction of the proppant slurry is not immediately followed by introduction of the microproppant slurry.

20 Claims, No Drawings

STAGED PROPPING OF FRACTURE NETWORKS

BACKGROUND

The present disclosure relates to methods for propping fracture networks in subterranean formations.

After a wellbore is drilled, it may often be necessary to fracture the subterranean formation to enhance hydrocarbon production, especially in tight formations like shales and tight-gas sands. Access to the subterranean formation can be achieved by first creating an access conduit (also referred to as a perforation) from the wellbore to the subterranean formation. Then, a fracturing fluid, often called a pad fluid, is introduced at pressures exceeding those required to maintain matrix flow in the formation permeability to create or enhance at least one fracture that propagates from at least one access conduit. The pad fluid is followed by a treatment fluid comprising a propping agent to prop the fracture open after pressure from the fluid is reduced. In some formations like shales, fractures can further branch into small fractures extending from a primary fracture giving depth and breadth to the fracture network created in the subterranean formation. As used herein, a "fracture network" refers to the access conduits, fractures, microfractures, and/or branches, man-made or otherwise, within a subterranean formation that are in fluid communication with the wellbore. As used herein, an "access conduit" refers to a passageway that provides fluid communication between the wellbore and the subterranean formation, which may include, but not be limited to, sliding sleeves, open holes in non-cased areas, hydrajetted holes, holes in the casing, perforations, and the like. The propping agents hold open the fracture network thereby maintaining the ability for fluid to flow through the fracture network to ultimately be produced at the surface.

In tight formations, especially those with high closure stresses, the widths of natural or induced microfractures are often smaller than traditional propping agents. Therefore, once the fluid pressure is released, the propping agent primarily maintains the fractures and branches of the fracture network while many of the microfractures close. In tight formations where microfractures are prevalent, this closure can significantly reduce the potential hydrocarbon material that can be produced from the subterranean formation before another fracturing and propping operation needs to be performed again, which can be expensive and time consuming.

DETAILED DESCRIPTION

The present disclosure relates to methods for propping complex fracture networks in subterranean formations.

The methods of the present disclosure may, in some embodiments, advantageously provide for propping the various portions of complex fracture networks (e.g., the fractures, branches, and microfractures) in tight formations (e.g., shales and tight-gas sands). In some embodiments, the methods of the present disclosure provide for staged propping operations that target propping the microfractures with small propping agents first followed by the larger fractures and branches with large propping agents. Propping microfractures of tight formations may advantageously enhance the amount of hydrocarbon that can be produced from a subterranean formation after a fracturing and propping operation, thereby reducing the time and cost associated with producing hydrocarbons from tight formations.

As noted above, a "fracture network," as used herein, refers to the access conduits, fractures, microfractures, dendritic and/or branches, man-made or otherwise, within a subterranean formation that are in fluid communication with the wellbore.

As used herein, the term "access conduit" refers to a passageway that provides fluid communication between the wellbore and the subterranean formation. As used herein, the term "fracture" refers to the primary fissure (manmade or natural) within the fracture network having a width of 5 mm or greater. As used herein, the term "branch" refers to a fissure within the fracture network having a width greater than 100 microns and less than 5 mm. As used herein, the term "microfracture" refers to a fissure extending from the fracture having a width of 50 microns or less.

It should be understood that the methods provided herein are applicable to wellbores and portions thereof at any angle including, but not limited to, vertical wells, deviated wells, highly deviated wells, horizontal wells, and hybrid wells comprising sections of any combination of the aforementioned wells. In some embodiments, a subterranean formation and wellbore may be provided with an existing fracture network. As used herein, the term "deviated wellbore" refers to a wellbore in which any portion of the well is that is oriented between about 55-degrees and about 125-degrees from a vertical inclination. As used herein, the term "highly deviated wellbore" refers to a wellbore that is oriented between about 75-degrees and about 105-degrees off-vertical.

The method of the present disclosure use one or more series of fluids to effectively place different sized proppants in the appropriate portions of the fracture network to enhance later hydrocarbon production.

As used herein, the terms "propping agents," "proppant," and grammatical variations thereof refer to any material or formulation that can be used to hold open at least a portion of a fracture network. Nonlimiting examples of propping agents are provided herein. As used herein, a "proppant pack" is the collection of propping agents in a fracture network. It should be understood that the term "particulate" or "particle," and derivatives thereof as used in this disclosure, includes all known shapes of materials, including spherical, substantially spherical, elongated having an aspect ratio of 2 to 10, fibrous materials having an aspect ratio greater than 10, polygonal materials (such as cubic materials), and mixtures thereof. As used herein, a particle is "substantially spherical" when the particle takes up 75% or more of the volume of a sphere having a diameter equaling the largest diameter of the particle.

As used herein, the term "series of fluids" refers to two or more fluids that are introduced into the wellbore in a sequence (including introduction of one or more of the fluids multiple times) but not necessarily the sequence listed unless otherwise specified by using the term "in order." For example, a series of fluids may comprise Fluid A, Fluid B, and Fluid C. In a first example, the sequence of introduction in order may be Fluid A, Fluid B, Fluid C, Fluid A, Fluid B, and Fluid C. Alternative, the sequence of introduction in order may be Fluid A, Fluid C, Fluid B, Fluid C, Fluid A, Fluid B, Fluid C, and Fluid A. In another alternative, the sequence of introduction in order may be Fluid C, Fluid B, Fluid C, Fluid B, and Fluid A.

For clarity and simplicity, as used herein, the term "micro-proppant" refers to proppant having a minimum diameter of 0.1 microns and having a number average diameter of about 0.5 microns to about 25 microns, including any subset therebetween (e.g., about 1 micron to about 10 microns). Further as used herein, the term "large proppant" refers to proppant having a number average diameter of about 75 microns to about 500 microns, including any subset therebetween (e.g., about 100 micron to about 250 microns, about 200 to about 500 microns, or about 150 to about 400 microns).

Methods of the present disclosure may include forming a fracture network in a subterranean formation or portion thereof by introducing a pad fluid at a pressure and/or rate sufficient to create and/or extend the fracture network. One skilled in the art will recognize the pressures and/or rates needed to create and/or extend the fracture network, which may depend on the fluid properties like viscosity, the formation properties like hardness and brittleness, and the like.

In some instances, hydraulic fracturing may be used where a viscosified pad fluid is utilized where the pressure of fluid introduction is primarily used to create and/or extend the fracture network. For example, a pad fluid may have a viscosity greater than 50 cP and comprise an aqueous base fluid, a gelling agent, a crosslinker, and a gel breaking agent (exemplary compositions of each are provided later herein). Optionally, the pad fluid may further comprise microproppant.

In some instances, a lower viscosity fluid may be used that relies primarily on the rate of fluid introduction to create and/or extend the fracture network. For example, a pad fluid may have a viscosity less than 20 cP and comprise an aqueous base fluid, a friction reducing polymer, and a friction reducer breaking agent (exemplary compositions of each are provided later herein). Optionally, the pad fluid may further comprise microproppant.

In some instances, a both hydraulic fracturing pad fluid and a lower viscosity pad fluid may be used in series. For example, a first pad fluid (a hydraulic fracturing pad fluid) having a viscosity greater than 50 cP and comprising an aqueous base fluid, a gelling agent, a crosslinker, and a gel breaking agent may be introduced into the subterranean formation first to create and/or extend the fracture network, and then, a second pad fluid having a viscosity less than 20 cP and comprising an aqueous base fluid, a friction reducing polymer, a friction reducer breaking agent, and a microproppant may be introduced. Without being limited by theory, it is believed the combination of the two fluids allows for the hydraulic fracturing pad fluid to primarily create the fractures and branches and some microfractures, and the lower viscosity pad fluid to create additional microfractures. Because the lower viscosity pad fluid comprises microproppant, the microproppant can be initially placed in many of the microfractures.

In the foregoing examples of forming a fracture network in a subterranean formation, a zonal isolation tool may be used (e.g., a packer) so that the fracture network extends from a portion of the formation. The zonal isolation tool may be removed or moved to allow for creating another fracture network in a different portion of the subterranean formation.

Once a fracture network is formed, a series of fluids may be introduced into the fractures to extend the fracture network and form a proppant pack therein where the series of fluids may include: (A) a microproppant slurry comprising a microproppant, (B) a proppant slurry comprising a large proppant, and (C) a sweep fluid having a microproppant solids weight percentage by weight of the sweep fluid that is from 0 to about the same microproppant solids weight percentage in the microproppant slurry (A) by weight of the microproppant slurry of (A), where (1) introduction of the microproppant slurry is not immediately followed by introduction of the proppant slurry and (2) introduction of the proppant slurry is not immediately followed by introduction of the microproppant slurry. Exemplary specific in order sequences of the fluids is provided in Table 1. Each of the examples may be optionally repeated multiple times or appropriately combined with another example such that stipulations (1) and (2) above remain true where an additional sweep fluid may be used to maintain stipulations (1) and (2).

TABLE 1

| Example | In Order Sequence of Fluids |
| --- | --- |
| 1 | C-A-C-B |
| 2 | C-B-C-A |
| 3 | C-B-C-B-C-A |
| 4 | C-B-C-A-C-B-C-B |
| 5 | A-C-B |
| 6 | A-C-B-C-B |
| 7 | A-B-C-B-C-B-C |

In some instances, the microproppant slurry may comprise an aqueous base fluid and a microproppant. Optionally, the microproppant slurry may further comprise one or more of: a friction reducer breaking agent, clay control additives, and surfactants.

In some instances, the proppant slurry may comprise an aqueous base fluid and a large proppant. Optionally, the proppant slurry may further comprise one or more of: a friction reducer breaking agent, clay control additives, and surfactants.

Exemplary materials that may be used as microproppant and/or large proppant may include, but are not limited to, sand, bauxite, fly ash, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

Microproppant may be present in the fluids/slurries described herein at about 0.001 pounds per gallon of the fluid/slurry (ppg) to about 1 ppg, including subsets therebetween (e.g., about 0.01 ppg to about 0.1 ppg, about 0.05 ppg to about 0.2 ppg, or about 0.1 ppg to about 1 ppg). Large proppant may be present in the fluids/slurries described herein at about 0.01 ppg to about 10 ppg, including subsets therebetween (e.g., about 0.1 ppg to about 1 ppg, about 0.2 ppg to about 6 ppg, or about 1 ppg to about 10 ppg).

In some instances, the sweep fluid may comprise an aqueous base fluid and be free to substantially free of solids like proppant, weighting material, and particulate viscosifiers (e.g., having a solids concentration of 0% to about 1% by weight of the sweep fluid). Optionally, the sweep fluid may further comprise one or more of: an aqueous base fluid, a friction reducing polymer, a friction reducer breaking agent, degradable particulate, acid, in-situ acid generator, chelating agent, foaming agent, scale inhibitor, paraffin inhibitor, asphaltene inhibitor, and biocide.

Optionally, once the series of fluids have been introduced into the fracture network, a diverting fluid comprising an aqueous base fluid and a diverting agent (and optionally a gelling agent, and optionally a crosslinking agent, and optionally a breaker) may be introduced into the fracture network to plug the access conduits. The diverting agent may act to divert subsequent fluids to other portions of the fracture network and/or subterranean formation. The diverting agent may later be removed (e.g., by degradation, which, for example, may be by hydrolysis in the presence of water or an acid) to return flow through the access conduits and allow for hydrocarbon production.

Each of the fluids, independently, may be introduced at a pressure and/or rate sufficient to create and/or extend the fracture network or at a pressure and/or rate sufficient to maintain the fracture network in an open state. For example, the sweep fluid may be a low viscosity fluid (e.g., having a viscosity less than about 20 cP) and introduced at a high flow rate (e.g., about 20 barrels per minute or greater) to facilitate movement of the microproppant and large proppant further into the fracture network. Further, the microproppant slurry may be introduced at a high flow rate to facilitate movement of the microproppant and large proppant further into the fracture network.

It is believed that proppant particles create mounds or dunes inside the fracture network. Then, where the fracture or branch splits, the proppant particles can collect at the entrance of the downstream fracture/branch/microfracture and causing bridges that restrict fluid flow through the entrance and screen out subsequently introduced proppant particles. Then, in portions of the fracture network with little or no proppant particles, the fracture/branch/microfracture can substantially to completely close and significantly reduce to completely stop fluid flow through that portion of the fracture network.

This mounding and screening out may be intensified when proppant particles of different sizes are used like the microproppant and large proppant described herein. The substantially solids-free sweep fluid of the present disclosure is introduced after the introduction of microproppant and large proppant to reduce mounding and push the proppant particles further into the fracture network, resulting in more effective proppant pack and increased hydrocarbon production in subsequent steps.

In some instances, each of the fluids/slurries in the series of fluids may be free to substantially free (e.g., comprising less than 0.1% by volume of the base fluid) of consolidating agents (e.g., non-aqueous tackifying agents, aqueous tackifying agents, emulsified tackifying agents, silyl-modified polyimide compounds, resins, polymerizable organic monomer compositions, consolidating agent emulsions, zeta-potential modifying aggregating compositions, silicon-based resins, and binders) that coat the proppant particles and cause the proppant particles to stick together or aggregate. Such aggregation could mitigate the efficacy of the sweep fluid.

The system used to deliver pad fluids, slurries, and sweep fluids described herein to a subterranean formation may include one or more mixing tanks, in which the various fluids and slurries described herein may be formulated. In other embodiments, however, the various fluids and slurries described herein may be formulated offsite and transported to a worksite.

The fluids/slurries described herein may be conveyed in order a line to a wellhead and enter a tubular extending from the wellhead into subterranean formation. That is, during a method described herein, the tubular may contain as series of fluids that comprise: a microproppant slurry, a large proppant slurry, and a sweep fluid, wherein the microproppant slurry and the proppant slurry are not adjacent in the series of fluids.

Upon being ejected from the tubular, the fluids/slurries described herein may subsequently penetrate into the subterranean formation to form either a fracture network or to form a proppant pack in the fracture network. In some instances, the tubular may have a plurality of orifices through which the fluids/slurries described herein may enter the wellbore proximal to a portion of the subterranean formation to be fractured/propped. In some instances, the wellbore may further comprise equipment or tools for zonal isolation of a portion of the subterranean formation to be treated.

A Pump may be configured to adjust the pressure and flow rate of the fluids/slurries described herein as needed before introduction into the tubular, whether the fluids are provided from the mixing tanks or other vessel (e.g., a truck, a railcar, a barge, or the like). Non-limiting additional components that may be present in the delivering system include, but are not limited to, supply hoppers, valves, condensers, adapters, joints, gauges, sensors, compressors, pressure controllers, pressure sensors, flow rate controllers, flow rate sensors, temperature sensors, and the like. Further, the system may be modified with suitable valves (before or after the pump) to appropriately inject the fluids/slurries described herein in the desired order.

The pump may be a high pressure pump in some embodiments. As used herein, the term "high pressure pump" will refer to a pump that is capable of delivering a fluid downhole at a pressure of 1000 psi or greater. A high pressure pump may be used when it is desired to introduce the fluids/slurries described herein to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of less than 1000 psi. In some embodiments, a low pressure pump may be fluidly coupled to a high pressure pump that is fluidly coupled to the tubular. That is, in such embodiments, the low pressure pump may be configured to convey the fluids/slurries described herein to the high pressure pump. In such embodiments, the low pressure pump may "step up" the pressure of the fluids/slurries described herein before it reaches the high pressure pump.

The methods of the present disclosure may be used in any subterranean formation capable of being fractured. Formations where the present methods may be most advantageous include, but are not limited to, formations with at least a portion of the formation characterized by very low permeability, high closure pressures, high brittleness index, and any combination thereof.

In some embodiments, at least a portion of a subterranean formation may have a permeability of about 0.1 nano Darcy (nD) to about 10 milli Darcy (mD), including subsets therebetween (e.g., about 0.1 nD to about 1 microD, about 100 nD to about 10 microD, about 1 microD to about 100 microD, about 250 microD to about 1 mD, or about 500 microD to about 10 mD). One method to determine the subterranean formation permeability includes The American Petroleum Institute Recommended Practice 40, "Recommended Practices for Core Analysis," Second Edition, February 1998.

In some embodiments, at least a portion of a subterranean formation may have a closure pressure greater than about 500 psi to an unlimited upper limit. While the closure pressure upper limit is believed to be unlimited, formations where the methods of the present disclosure may be applicable include formations with a closure pressure of about 500 psi to about 20,000 psi, including subsets therebetween (e.g., about 500 psi to about 2,500 psi, about 1,000 psi to about 10,000 psi, or about 5,000 psi to about 20,000 psi). One method to determine the subterranean formation closure pressure includes the method presented in the Society for Petroleum Engineers paper number 60321 entitled "Case History: Observations From Diagnostic Injection Tests in Multiple Pay Sands of the Mamm Creek Field, Piceance Basin, Colo."

In some embodiments, at least a portion of a subterranean formation may have a brittleness index of about 5 to about 150, including subsets therebetween (e.g., about 5 to about 25, about 10 to about 50, about 25 to about 100, or about 75 to about 150). Brittleness is a composite of Poisson's ratio and Young's modulus. One method to determine the brittleness index of a subterranean formation includes the method presented in the Society for Petroleum Engineers paper number 132990 entitled "Petrophysical Evaluation of Enhancing Hydraulic Stimulation in Horizontal Shale Gas Wells."

In certain embodiments, all or part of a wellbore penetrating the subterranean formation may include casing pipes or strings placed in the wellbore (a "cased hole" or a "partially cased hole"), among other purposes, to facilitate production of fluids out of the formation and through the wellbore to the surface. In other embodiments, the wellbore may be an "open hole" that has no casing.

Exemplary aqueous base fluids for optional use in the fluids and slurries described herein may include, but are not limited to, fresh water, saltwater (e.g., water containing one or more salts dissolved therein), brine (e.g., saturated salt water), seawater, and the like, and any combination thereof. In some instances, an aqueous-miscible fluid may optionally be included with the aqueous base fluid at up to about 20% by weight of the aqueous base fluid. Exemplary aqueous-miscible base fluids for optional use in the fluids and slurries described herein may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, and the like, and any combination thereof.

Exemplary friction reducing polymers for optional use in the fluids and slurries described herein may include, but are not limited to, synthetic polymers that comprise one or more monomeric units like acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and the like, and any combination thereof. Such synthetic polymers may be an acid form or in a salt form. Exemplary commercially available friction reducing polymers include, but are not limited to, FR-66™ and FDP-835™ (each being a partially hydrolyzed polyacrylamide, available from Halliburton Energy Services, Inc.). The friction reducing polymers, when used in the fluids and slurries described herein, may be present in an amount of about 0.01% to about 0.2% by weight of the fluid/slurry, including subsets therebetween (e.g., about 0.01% to about 0.1%, about 0.05% to about 0.2%, or about 0.1% to about 0.2%).

Exemplary friction reducer breaking agents for optional use in the fluids and slurries described herein may include, but are not limited to, sodium percarbonate, potassium percarbonate, ammonium percarbonate, sodium persulfate, potassium persulfate, ammonium persulfate and sodium perborate, and the like, and any combination thereof. In some preferred instances, the friction reducer breaking agent may produce hydrogen peroxide upon hydrolysis. The friction reducer breaking agents, when used in the fluids and slurries described herein, may be present in an amount of about 0.005% to about 1% by weight of the fluid/slurry, including subsets therebetween (e.g., about 0.005% to about 0.1%, about 0.05% to about 0.5%, or about 0.1% to about 1%).

Exemplary gelling agents for optional use in the fluids and slurries described herein may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, 2,2'-azobis(2,4-dimethyl valeronitrile), 2,2'-azobis (2,4-dimethyl-4-methoxy valeronitrile), polymers and copolymers of acrylamide ethyltrimethyl ammonium chloride, acrylamide, acrylamido-and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacry late, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and the like, and any combination thereof. The gelling agents, when used in the fluids and slurries described herein, may be present in an amount of about 0.1% to about 10% by weight of the fluid/slurry, including subsets therebetween (e.g., about 0.1% to about 2%, about 0.5% to about 5%, or about 1% to about 10%).

Exemplary crosslinker for optional use in the fluids and slurries described herein may include, but are not limited to, borate ions, magnesium ions, zirconium IV ions, titanium IV ions, aluminum ions, antimony ions, chromium ions, iron ions, copper ions, magnesium ions, and zinc ions, and the like, and any combination thereof. The crosslinker, when used in the fluids and slurries described herein, may be present in an amount of about 0.005% to about 1% by weight of the fluid/slurry, including subsets therebetween (e.g., about 0.005% to about 0.1%, about 0.05% to about 0.5%, or about 0.1% to about 1%).

Exemplary gel breaking agents for optional use in the fluids and slurries described herein may include, but are not limited to, the enzyme type, the oxidizing type, the acid buffer type, and the like, and any combination thereof, which are well known to those skilled in the art. Gel breaking agents may cause fluids to reduce in viscosity to assist with producing the fluids back to the surface after use. The gel breaking agents, when used in the fluids and slurries described herein, may be present in an amount of about 0.005% to about 1% by weight of the fluid/slurry, including subsets therebetween (e.g., about 0.005% to about 0.1%, about 0.05% to about 0.5%, or about 0.1% to about 1%).

Exemplary diverting agents for optional use in the fluids and slurries described herein may include, but are not limited to, polysaccharides (e.g., dextran or cellulose), chitins, chitosans, proteins, aliphatic polyesters, poly(lactides), poly(glycolides), poly($\varepsilon$-caprolactones), poly(hydroxybutyrates), poly(anhydrides), aliphatic polycarbonates, aromatic polycarbonates, poly(orthoesters), poly(amino acids), poly(ethylene oxides), polyphosphazenes, anhydrous sodium tetraborate (also known as anhydrous borax), anhydrous boric acid, and the like and any combination thereof. Of these suitable polymers, aliphatic polyesters and polyanhydrides may be preferred, and the like, and any combination thereof. The diverting agents may have a number average diameter of about 0.5 microns to about 1000 microns, including any subset therebetween (e.g., about 10 micron to about 10 microns, about 50 to about 250 microns, or about 250 to about 1000 microns). The diverting agents, when used in the fluids and slurries described herein, may be present in an amount of 0.001 ppg to about 10 ppg, including subsets therebetween (e.g., about 0.01 ppg to about 1 ppg, about 1 ppg to about 5 ppg, about 0.2 ppg to about 6 ppg, or about 2 ppg to about 10 ppg).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Embodiments disclosed herein include:

A. a series of fluids that comprise: a microproppant slurry comprising microproppant having an average diameter less than about 25 microns; a proppant slurry comprising a proppant having an average diameter of about 75 microns to about 500 microns; and a sweep fluid having a microproppant weight percentage by weight of the sweep fluid that is from 0 to about the same of the microproppant weight percentage in the microproppant slurry by weight of the microproppant slurry.

B. a system comprising a pump fluidly coupled to a tubular extending into a wellbore penetrating a subterranean formation, wherein the tubular contains the series of fluids of Embodiment A, and wherein the microproppant slurry and the proppant slurry are not adjacent in the series of fluids.

C. a method comprising creating a fracture network extending from a wellbore into a subterranean formation; then, introducing the series of fluids of Embodiment A into the fracture network in a subterranean formation, thereby forming a proppant pack in the fracture network, and wherein introduction of the microproppant slurry is not immediately followed by introduction of the proppant slurry, and wherein introduction of the proppant slurry is not immediately followed by introduction of the microproppant slurry.

Each of embodiments A, B, and C may have one or more of the following additional elements in any combination, unless otherwise provided for: Element 1: wherein the microproppant slurry comprises an aqueous base fluid, a friction reducing agent, and a microproppant having an average diameter less than about 25 microns; Element 2: wherein the proppant slurry comprises an aqueous base fluid, a friction reducing agent, and a proppant having an average diameter of about 75 microns to about 500 microns; Element 3: wherein the sweep fluid further comprises an aqueous base fluid and a friction reducing agent; Element 4: wherein the sweep fluid further comprises an aqueous base fluid and is free to substantially free of solids like proppant, weighting material, and particulate viscosifiers; Element 5: wherein the sweep fluid has a viscosity of 20 cP or less; Element 6: wherein each fluid in the series of fluids is substantially free of a consolidating agent; Element 7: wherein the sweep fluid, the microproppant slurry, and the proppant slurry each have a viscosity less than about 20 cP. Element 8: wherein the microproppant and/or large proppant are selected from sand, bauxite, fly ash, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

In combination with any elements for Embodiments A-C described above, Embodiment C may have one or more of the following additional elements in any combination, unless otherwise provided for: Element 1: wherein the method further comprises after introducing the series of fluids, placing a diverting fluid comprising an aqueous base fluid and a diverting agent into access conduits of the fracture network; Element 2: wherein the diverting agent in Element 1 is degradable; Element 3: wherein introducing the microproppant slurry is at the pressure and/or rate sufficient to create and/or extend the fracture network; Element 4: wherein introducing the series of fluids is at the pressure and/or rate sufficient to create and/or extend the fracture network; Element 5: wherein the series of fluids are introduced in a sequence comprising, in order, the microproppant slurry, the sweep fluid, the proppant slurry, the sweep fluid, and the proppant slurry; Element 6: wherein the series of fluids are introduced in a sequence comprising, in order, the sweep fluid, the proppant slurry, the sweep fluid, and the microproppant slurry; Element 7: wherein creating the fracture network comprises: introducing a pad fluid into the wellbore penetrating the subterranean formation at a pressure and/or rate sufficient to create and/or extend the fracture network in the subterranean formation, wherein the pad fluid comprises an aqueous base fluid, a friction reducing polymer, a friction reducer breaking agent, and the microproppant having the average diameter less than about 25 microns, and wherein the pad fluid has a viscosity less than 20 cP; Element 8: wherein creating the fracture network comprises: introducing a pad fluid into the wellbore penetrating the subterranean formation at a pressure and/or rate sufficient to create and/or extend the fracture network in the subterranean formation, wherein the pad fluid comprises an aqueous base fluid, a gelling agent, a crosslinker, and a gel breaking agent, and wherein the pad fluid has a viscosity greater than about 50 cP; Element 9: wherein creating the fracture network comprises: introducing a first pad fluid followed by a second pad fluid each at a pressure and/or rate sufficient to create and/or extend the fracture network in the subterranean formation, wherein the first pad fluid has a viscosity greater than about 50 cP and comprises a first aqueous base fluid, a gelling agent, a crosslinker, and a gel breaking agent, and wherein the second pad fluid has a viscosity less than about 20 cP and comprises a second aqueous base fluid, a friction reducing polymer, a friction reducer breaking agent, and the microproppant; Element 10: wherein at least one of the fluids in the series of fluids is introduced into the wellbore more than once.

To facilitate a better understanding of the embodiments of the present disclosure, the following examples of preferred or representative embodiments are given. In no way should the following examples be read to limit, or to define, the scope of the invention.

EXAMPLES

A slot flow device having a 0.25 in×2 in×8 in sized slot was used to simulate a fracture. In two experiments, fluids were flowed through the slot flow device to determine how much microproppant is trapped by mounding of the large proppant.

In a first experiment, the large proppant and microproppant were introduced in the same fluid: 2 lb/gal 40/70 sand, 20 gal/1000 gal base fluid (gpt) APOLLO™ (silica microparticles available from Apollo Scientific), and 1 gpt FR-66™ in an aqueous base fluid. The fluid was flowed through the slot flow device at 200 mL/min for 3 to 5 minutes. After the flow was stopped, the amount of APOLLO™ remaining in the slot flow device was 0.98% of the APOLLO™ introduced during flow.

In a second experiment, the large proppant and microproppant were introduced in a staged manner with a sweep fluid between. The large proppant slurry was 2 lb/gal 40/70 sand and 1 gpt FR-66™ in an aqueous base fluid. The microproppant slurry was 20 ppt APOLLO™ and 1 gpt FR-66™ in an aqueous base fluid. The sweep fluid was 1 gpt FR-66™ in an aqueous base fluid. The series of fluids were flowed through the slot flow device at 200 mL/min in the following sequence, in order, the large proppant slurry for 60 seconds, the sweep fluid for 15 seconds, the microproppant slurry for 12 seconds, the sweep fluid for 15 seconds, the large proppant slurry for 60 seconds, the sweep fluid for 15 seconds, and the microproppant slurry for 12 seconds. After the flow was stopped, the amount of APOLLO™ remaining in the slot flow device was 0.24% of the APOLLO™ introduced during flow, even with the experiment ending on a flow of microproppant.

These examples illustrate that the use of a sweep fluid not only reduces intermixing of two fluids, APOLLO™ and 40/70 sand, but also mitigates mounding and bridging of the proppant particles and allows for the proppant particles, especially the microproppant particles, to traverse the fracture network further into the formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
creating a fracture network extending from a wellbore into a subterranean formation;
then, introducing a series of fluids into the fracture network in the subterranean formation, thereby forming a proppant pack in the fracture network, wherein the series of fluids comprise:
a microproppant slurry comprising a microproppant having an average diameter less than about 25 microns and present in a concentration of about 0.001 pounds per gallon (ppg) of the microproppant slurry to about 1 ppg;
a proppant slurry comprising a proppant having an average diameter of about 75 microns to about 500 microns and present in a concentration of about 0.01 ppg of the proppant slurry to about 10 ppg; and
a sweep fluid having a microproppant weight percentage by weight of the sweep fluid that is from 0 to about the same microproppant weight percentage in the microproppant slurry by weight of the microproppant slurry; and wherein introduction of the microproppant slurry is not immediately followed by introduction of the proppant slurry, and wherein introduction of the proppant slurry is not immediately followed by introduction of the microproppant slurry.

2. The method of claim 1 further comprising:
after introducing the series of fluids, placing a diverting fluid comprising an aqueous base fluid and a diverting agent into access conduits of the fracture network.

3. The method of claim 2, wherein the diverting agent is degradable.

4. The method of claim 1, wherein introducing the microproppant slurry is at a pressure and/or rate sufficient to create and/or extend the fracture network.

5. The method of claim 1, wherein introducing the series of fluids is a pressure and/or rate sufficient to create and/or extend the fracture network.

6. The method of claim 1, wherein the sweep fluid has a viscosity of 20 cP or less.

7. The method of claim 1, wherein the series of fluids are introduced in a sequence comprising, in order, the microproppant slurry, the sweep fluid, the proppant slurry, the sweep fluid, and the proppant slurry.

8. The method of claim 1, wherein the series of fluids are introduced in a sequence comprising, in order, the sweep fluid, the proppant slurry, the sweep fluid, and the microproppant slurry.

9. The method of claim 1, wherein each fluid in the series of fluids is substantially free of a consolidating agent.

10. The method of claim 1, wherein creating the fracture network comprises: introducing a pad fluid into the wellbore penetrating the subterranean formation at a pressure and/or rate sufficient to create and/or extend the fracture network in the subterranean formation, wherein the pad fluid comprises an aqueous base fluid, a friction reducing polymer, a friction reducer breaking agent, and the microproppant having the average diameter less than about 25 microns, and wherein the pad fluid has a viscosity less than 20 cP.

11. The method of claim 1, wherein creating the fracture network comprises: introducing a pad fluid into the wellbore penetrating the subterranean formation at a pressure and/or rate sufficient to create and/or extend the fracture network in the subterranean formation, wherein the pad fluid comprises an aqueous base fluid, a gelling agent, a crosslinker, and a gel breaking agent, and wherein the pad fluid has a viscosity greater than about 50 cP.

12. The method of claim 1, wherein creating the fracture network comprises: introducing a first pad fluid followed by a second pad fluid each at a pressure and/or rate sufficient to create and/or extend the fracture network in the subterranean formation, wherein the first pad fluid has a viscosity greater than about 50 cP and comprises a first aqueous base fluid, a gelling agent, a crosslinker, and a gel breaking agent, and wherein the second pad fluid has a viscosity less than about 20 cP and comprises a second aqueous base fluid, a friction reducing polymer, a friction reducer breaking agent, and the microproppant.

13. The method of claim 1, wherein at least one of the fluids in the series of fluids is introduced into the wellbore more than once.

14. A method comprising:
creating a fracture network extending from a wellbore into a subterranean formation;
then, introducing a series of fluids into the fracture network in the subterranean formation, thereby forming a proppant pack in the fracture network, wherein the series of fluids comprise:
a microproppant slurry comprising an aqueous base fluid, a friction reducing agent, and a microproppant having an average diameter less than about 25 microns and present in a concentration of about 0.001 pounds per gallon (ppg) of the microproppant slurry to about 1 ppg;
a proppant slurry comprising an aqueous base fluid, a friction reducing agent, and a proppant having an average diameter of about 75 microns to about 500 microns and present in a concentration of about 0.01 ppg of the proppant slurry to about 10 ppg; and
a sweep fluid comprising an aqueous base fluid and a friction reducing agent and having a microproppant weight percentage by weight of the sweep fluid that is from 0 to about the same microproppant weight percentage in the microproppant slurry by weight of the microproppant slurry; and
wherein introduction of the microproppant slurry is not immediately followed by introduction of the proppant slurry, and wherein introduction of the proppant slurry is not immediately followed by introduction of the microproppant slurry.

15. The method of claim 14, wherein the sweep fluid has a viscosity less than about 20 cP.

16. The method of claim 14, wherein the sweep fluid, the microproppant slurry, and the proppant slurry each have a viscosity less than about 20 cP.

17. The method of claim 14 further comprising:
after introducing the series of fluids, placing a diverting fluid comprising an aqueous base fluid and a diverting agent into access conduits of the fracture network.

18. The method of claim 14, wherein introducing the microproppant slurry is at a pressure and/or rate sufficient to create and/or extend the fracture network.

19. The method of claim 14, wherein each fluid in the series of fluids is substantially free of a consolidating agent.

20. A system comprising:
a pump fluidly coupled to a tubular extending into a wellbore penetrating a subterranean formation, wherein the tubular contains a series of fluids that comprise: a microproppant slurry comprising a microproppant having an average diameter less than about 25 microns and present in a concentration of about 0.001 pounds per gallon (ppg) of the microproppant slurry to about 1 ppg; a proppant slurry comprising a proppant having an average diameter of about 75 microns to about 500 microns and present in a concentration of about 0.01 pp of the proppant slurry to about 10 ppg; and a sweep fluid having a microproppant weight percentage by weight of the sweep fluid that is from 0 to about the same microproppant weight percentage in the microproppant slurry by weight of the microproppant slurry; and wherein the microproppant slurry and the proppant slurry are not adjacent in the series of fluids.

* * * * *